United States Patent
Gebby et al.

(10) Patent No.: US 7,204,235 B1
(45) Date of Patent: Apr. 17, 2007

(54) METHOD OF MANAGING ENGINE TORQUE UPON LOSS OF ENGINE COOLANT

(75) Inventors: Brian P Gebby, Ferndale, MI (US); Robert Rotay, Grand Blanc, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/248,363

(22) Filed: Oct. 12, 2005

(51) Int. Cl.
  *F02D 7/00* (2006.01)
  *F02B 77/00* (2006.01)
(52) U.S. Cl. .................... 123/481; 123/198 F; 123/435
(58) Field of Classification Search ................ 123/481, 123/435, 443, 692, 697
  See application file for complete search history.

(56) References Cited

U.S. PATENT DOCUMENTS

| | | | |
|---|---|---|---|
| 4,473,045 A | 9/1984 | Bolander et al. | |
| 5,094,192 A | 3/1992 | Seiffert et al. | |
| 5,555,871 A | 9/1996 | Gopp et al. | |
| 6,305,344 B1 | 10/2001 | Perry | |
| 6,389,806 B1 * | 5/2002 | Glugla et al. | 60/284 |
| 6,681,563 B2 * | 1/2004 | Glugla et al. | 60/285 |
| 7,072,758 B2 * | 7/2006 | Kolmanovsky et al. | 701/103 |
| 2002/0069638 A1 * | 6/2002 | Glugla et al. | 60/284 |
| 2002/0129597 A1 * | 9/2002 | Glugla et al. | 60/274 |
| 2004/0206071 A1 * | 10/2004 | Glugla et al. | 60/285 |
| 2005/0205038 A1 * | 9/2005 | Lewis et al. | 123/179.18 |
| 2005/0205044 A1 * | 9/2005 | Lewis et al. | 123/198 F |
| 2005/0205060 A1 * | 9/2005 | Michelini et al. | 123/432 |
| 2005/0209045 A1 * | 9/2005 | Lewis | 477/107 |
| 2006/0005802 A1 * | 1/2006 | Lewis et al. | 123/198 F |

* cited by examiner

*Primary Examiner*—John T. Kwon
(74) *Attorney, Agent, or Firm*—Thomas A. Jurecko

(57) ABSTRACT

An engine torque management system of a V-style engine utilizes a cylinder head metal temperature sensor in each cylinder head to detect a temperature. When the sensor temperature rises above a threshold value for a particular time period, the response software shuts down the fuel injection of a bank of cylinders in which the sensor is installed. Cool, uncombusted intake air cools that bank and an external fan blows air over that bank. If the sensor in the second bank of cylinders rises above the threshold, the fuel injection on that bank shuts off to undergo cooling while the fuel injection on the first bank restarts. Alternation between the two banks occurs to maintain the desired level of torque demanded by the vehicle driver.

8 Claims, 4 Drawing Sheets

METHOD OF MANAGING ENGINE TORQUE UPON LOSS OF ENGINE COOLANT

FIELD OF THE INVENTION

The present invention relates to a method of managing engine torque when an internal combustion engine overheats, for example, from a loss of its liquid coolant.

BACKGROUND OF THE INVENTION

Modern vehicular engines typically manage engine speeds in response to a variety of conditions such as engine intake air quality and operator speed requirements. While improvements in engine operation management have generally been satisfactory for their purposes, appropriately managing the engine torque output in specific running situations, such as a "limp home" situation, have not been without their share of limitations. Accordingly, a need exists for an apparatus and method for efficiently managing engine torque to maintain engine and road speeds after an engine loses its liquid coolant by alternating the combustion of opposing banks of the engine in a V-style engine arrangement.

SUMMARY OF THE INVENTION

A method of controlling engine output torque in a dual cylinder bank engine, such as a V-style engine in which each cylinder bank has a cylinder head, involves sensing a number of temperatures from at least one cylinder head (the first cylinder head) sensor when the temperature of the cylinder head rises above a threshold temperature for a period of time. Alternatively, the sensed temperatures can come from more than one source, such as from a cylinder head metal sensor and from a liquid coolant temperature sensor.

As long as the above-mentioned temperature is greater than a threshold temperature, the cylinder banks are placed into an alternating combustion scenario where only one cylinder bank is operated at a time. That is, the cylinder banks are alternated such that only one bank undergoes combustion at any one time. While an engine bank is not undergoing combustion, a fan cools that particular cylinder bank. The opposite engine bank also has a cooling fan. Even while a cylinder bank is not undergoing combustion and is being cooled by a cooling fan, the pistons still draw cool intake air into the cylinder, which also helps to cool the non-combusting cylinder bank. This alternating process is continued until the vehicle reaches a repair facility to cure the cause of the elevated engine temperature. While the vehicle is experiencing the torque control methodology, the engine continues to output torque requested by the driver.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. The teachings of the present invention relate to a method of managing torque after a thermal event is experienced by an internal combustion engine due to, for example, a loss of coolant, or other occurrence that mimics a loss of coolant. Events that mimic a loss of coolant generally result in increased temperatures of and about a vehicular engine. More specifically, the method relates to a strategy for reacting to the thermal event, a loss of coolant being an example of such event, which is used for purposes of description in this writing. The method of operation of the teachings of the present invention assumes that if one engine cylinder head is above a threshold temperature, then the second cylinder head in a dual head engine, is also above that threshold temperature.

The temperature that the method utilizes can be obtained from a variety of sources. The first source is a sensed metal temperature of a cylinder head of the engine, the temperature being sensed with a sensor that is designed to measure metal temperature. Alternatively, a liquid coolant temperature can be utilized, or preferably, a combination of the sensed liquid coolant temperature and the cylinder head metal temperature. While the liquid coolant temperature normally senses the temperature of the liquid coolant within an engine, the sensor may actually sense the air temperature of the air surrounding the sensor after the liquid coolant has drained from the engine, if such an event occurs. While liquid coolant sensors do not normally sense air temperature, they could be calibrated to do such.

For purposes of illustration regarding the teachings of the present invention, there is one temperature sensor on each side of the engine, in each cylinder head, and an engine coolant temperature sensor; however, additional sensors could be utilized in a more elaborate temperature sensing matrix to sense temperatures from other engine parts. One advantage to sensing temperatures from more than one engine part is that an average temperature from those various sources may be used in a decision routine or algorithm to react to such a thermal event.

Figure 3:
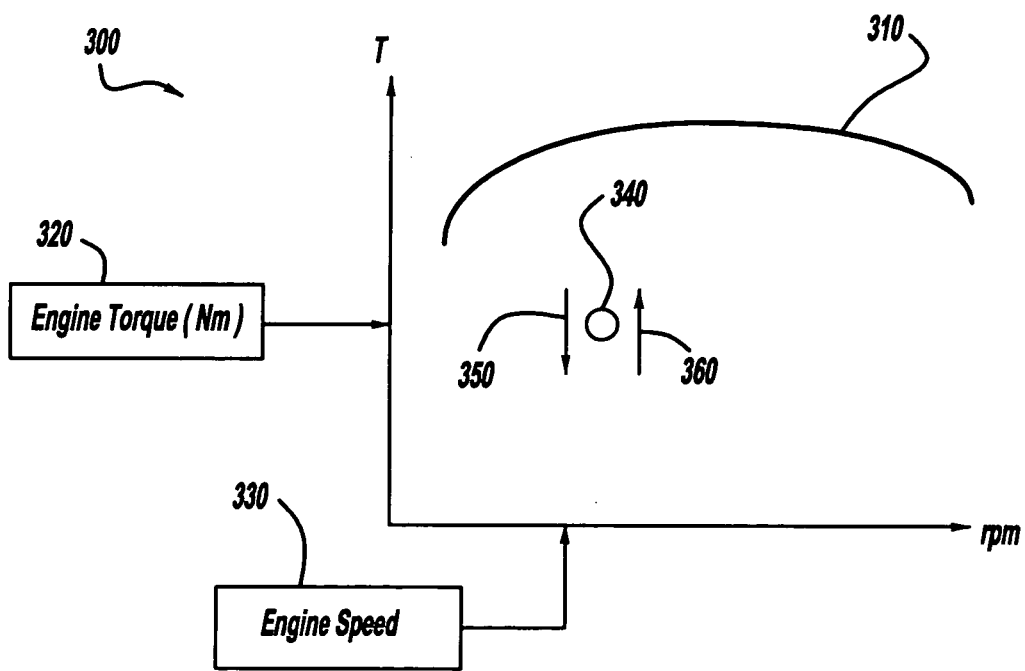
FIG. 3 is a graph of engine torque versus engine speed depicting a domed curve, at any specific point under which a vehicle engine operates at a given torque for a given, driver-controlled engine speed.
Figure 4:
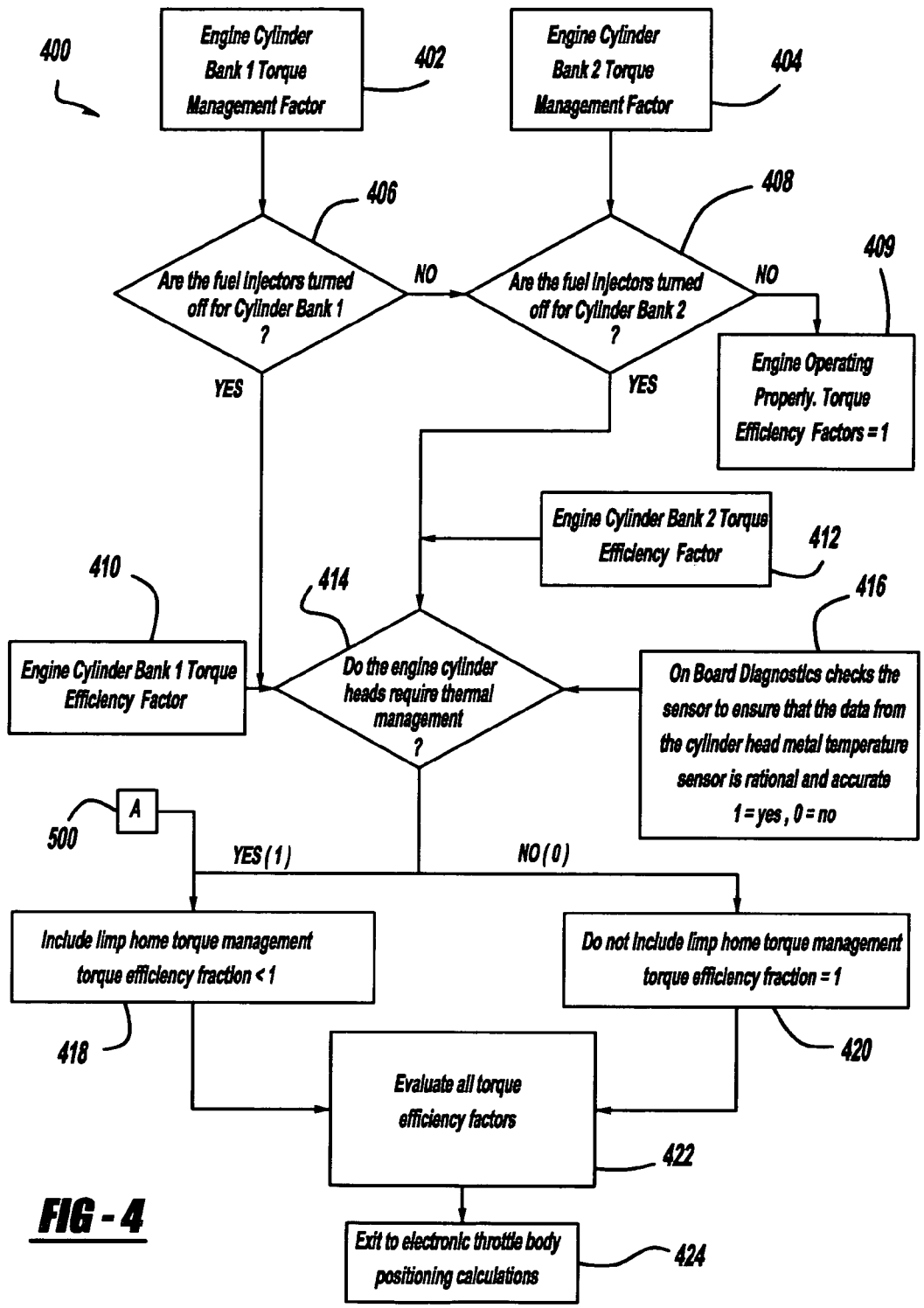
FIG. 4 is a flowchart of a torque management process for managing torque output of individual engine banks in an engine.
Figure 5:
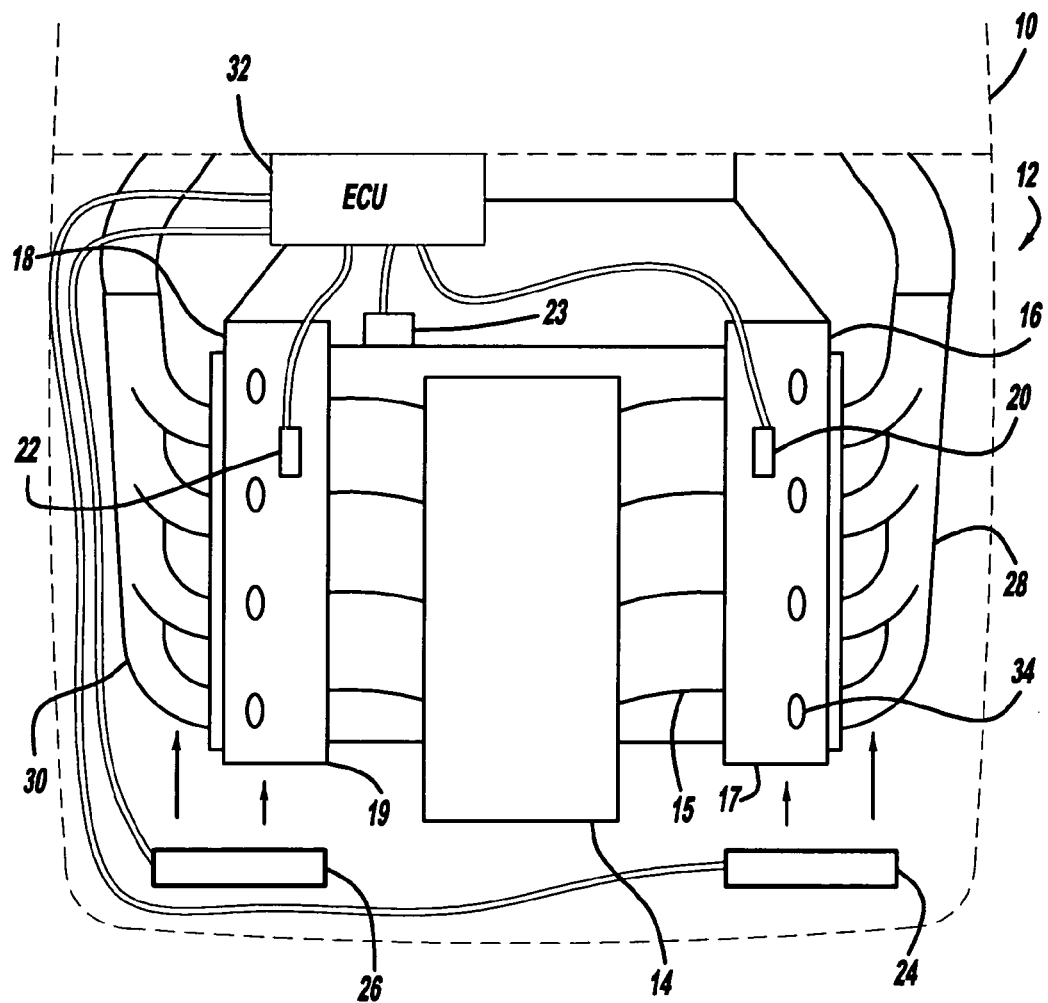
FIG. 5 is a top view of an engine compartment depicting various torque-managing components of the torque management system.

FIGS. 1 through 5 depict various flowcharts, graphs and an engine diagram to assist with understanding the written description of the teachings of the present invention. Before describing the processing and control methodologies of the teachings of the present invention, the engine parts involved will be described. FIG. 5 is a top view of an engine compartment depicting various torque-managing components of the torque management system of the teachings of the present invention. An outline of a front portion of a vehicle 10 in which an engine 12 resides is shown. To effectuate the process and routines involved in the teachings of the present invention, the engine 12 contains various components. A cylinder block 14 has a left cylinder bank 16 with a left cylinder head 17 and a right cylinder bank 18 with a right cylinder head 19. A plurality of spark plugs 34, one per engine cylinder, each spark to cause the combustion that causes each cylinder to generate heat as a fuel is ignited.

A left head temperature sensor 20 senses the temperature of the material of the left cylinder head 17, while a right head temperature sensor 22 senses the temperature of the material of the right cylinder head 19. The combustion gases that cause the temperatures of the respective cylinder heads to rise, exit through a left exhaust manifold 28 for the left cylinder bank 16, and a right exhaust manifold 30 for the right cylinder bank 18. A left fan 24 primarily cools the left cylinder bank 16 while a right fan 26 primarily cools the right cylinder bank 18, in accordance with the cooling needs of the engine. There may also be a centrally-located cooling fan located between the left fan 24 and right fan 26. An engine control unit 32, also called an electronic control unit, or ECU, receives the sensed temperatures. The ECU 32 receives and analyses the data read from the left head temperature sensor 20, right head temperature sensor 22, and the coolant sensor 23. The left fan 24 and the right fan 26 are also connected to the ECU 32. The coolant sensor 23 senses the temperature of the engine coolant that circulates through the engine cylinder block 14 and around and below the left cylinder head 17 and right cylinder head 19.

Figure 1:
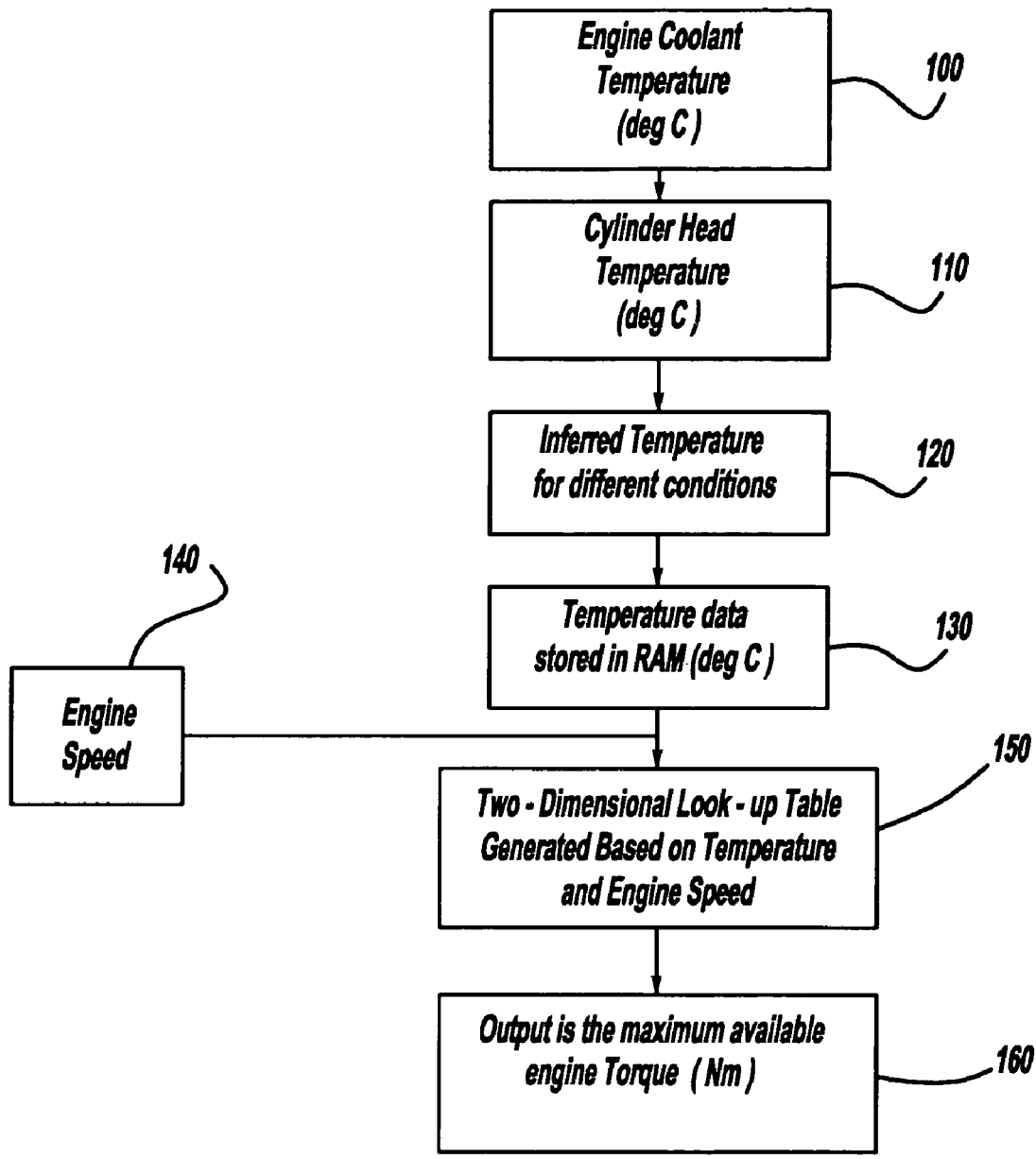
FIG. 1 is a flowchart of how engine coolant temperature and cylinder head temperature signals are filtered by control system software in order to ensure the stability of the software response.

The control methodology and operative workings of the present invention will now be described. FIG. 1 is a flowchart depicting how engine temperature signals, specifically, engine cylinder head metal temperatures and engine coolant temperatures, are filtered by control system software in order to ensure the stability of the software response. In FIG. 1 at step 100, an engine coolant temperature in degrees Celcius is detected by a coolant sensor 23 located in the engine cylinder block 14 of an engine 12. The engine 12 may be any typical V-style internal combustion engine, such as a V6 or V8 engine, but for illustrative purposes with regard to the teachings of the present invention, a V-8 engine is assumed.

At step 110, a cylinder head temperature in degrees Celsius, which may be a raw cylinder head metal temperature, is detected by the temperature sensor in one of the cylinder heads of the internal combustion engine. The raw cylinder head metal temperature that is read at step 110 is stored in RAM 130 in a powertrain control unit or engine control unit 32 of a vehicle 10. Before such a temperature is stored in RAM, an inferred temperature is determined at step 120. This inferred temperature is determined from at least one of the engine coolant temperature and the cylinder head temperature. The powertrain control unit or engine control unit 32 is also the storage place for the ambient air temperature outside of the vehicle 10 and also for the coolant temperature of the liquid coolant circulated through the engine 12 to cool the engine 12. The temperatures that are stored in RAM are originally read by the sensors as voltages within the sensors and then those voltages are converted to temperatures, which are then stored in RAM variables.

Next, at step 140, the engine speed is read into RAM as a RAM variable. The temperature signal is combined with the RAM variable of engine speed, and these two inputs are placed into a two-dimensional table, as indicated at step 150. The two-dimensional table has one axis that is temperature (° C.) and the other axis is engine speed (RPM). As the temperature increases away from nominal, the maximum power output of the engine may be reduced. Nominal temperature is the temperature of the system as defined when the engine has coolant in it with variance for ambient conditions and engine load.

The thermal protection table at step 150 can be viewed another way, that is, as the maximum engine output torque limit. That is, as the signal, which is the temperature, rises above nominal, the torque management system observes such a rise and makes a decision such that the thermal protection is becoming a more vital consideration of the engine operation and, therefore, the result of the temperature storage calculation will be recognized and conclude that maximum engine output should be reduced. The result of this look up table is an output at step 160 of the maximum available engine torque given the temperature conditions.

Figure 2:
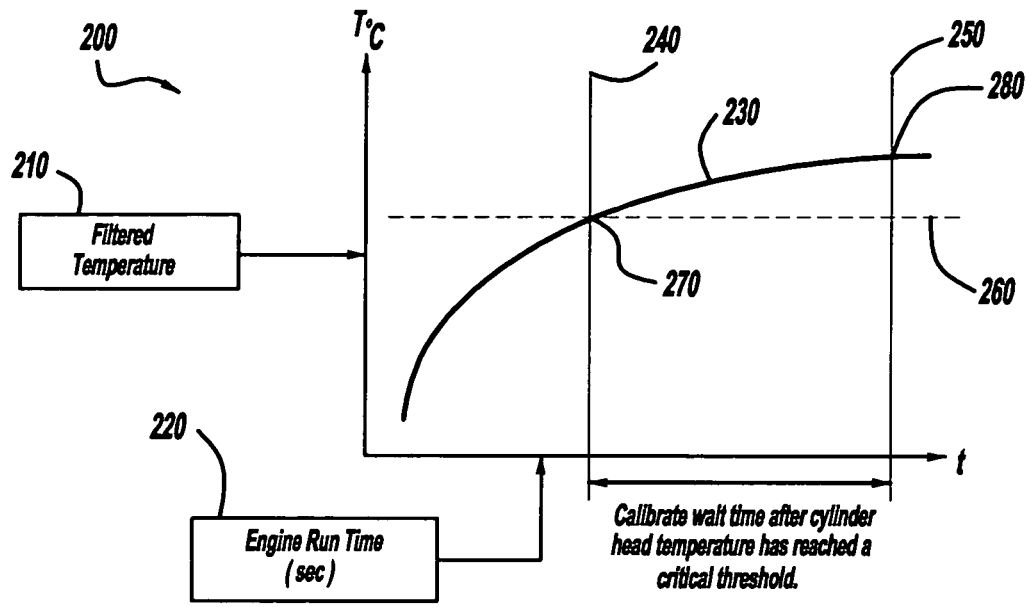
FIG. 2 is a graph of temperature versus time depicting a time period during which the filtered temperature has experienced a temperature above a threshold temperature.

Turning to FIG. 2, which is a graph of temperature versus time, further explanation of how a thermal event is determined will be explained. The temperature on the vertical axis in FIG. 2 is the cylinder head temperature. This temperature may be only the cylinder head metal temperature, the engine coolant temperature, or a combination of both. Additionally, other temperatures related to engine operation may be utilized in the temperature. An advantage of using a cylinder head metal temperature sensor is that normal engine coolant sensors are usually submersed in liquid coolant; however, if there is a loss of coolant, the engine coolant sensor quickly becomes surrounded by air and not the liquid coolant. Because of this occurrence, the temperature rise that the sensor detects is very slow since air conducts heat at a different rate than most solid metals. Therefore, regarding the teachings of the present invention, the cylinder head metal temperature sensor is actually not in fluid, but it is in the metal cylinder head, surrounded by metal. Additionally, such a sensor is located near at least one of the engine exhaust ports so that it can respond more quickly to thermal events, like a loss of coolant, than it would if it were not located proximate an exhaust port.

Continuing with reference to FIG. 2, once the temperature rises above a particular critical or threshold temperature, indicated by the dashed line 260 of FIG. 2, a loss of coolant is assumed and confirmed by the software routine. The particular time and temperature at which the coolant is assumed to have been lost is shown as point 270 in FIG. 2, which is the intersection of vertical time line 240, horizontal temperature line 260, and temperature-time curve 230. At point 270, the temperature that the sensor, either the left cylinder head temperature sensor 20, right cylinder head metal temperature sensor 22, or other sensor, is reading continues to rise as time progresses.

The vertical time line 250 is the time at which a flag is set in RAM that confirms the previously assumed loss of coolant. Time point 280 corresponds to the intersection of the temperature-time curve 230 and the time line 250. This point also corresponds to a temperature above the threshold temperature 260. The time period between time lines 240 and 250 is the time period during which the temperature is being sensed at a temperature above the critical temperature 260.

The vertical axis (Y axis) of FIG. 2 is the temperature 210, so the flow and description of FIG. 1 provides an explanation for the vertical axis of FIG. 2. Additionally, and related to temperature, the material of the engine block and cylinder head play a role in transferring heat to the cylinder head metal temperature sensor so that a temperature can be detected. An iron engine block and cylinder head absorb heat for a period of time longer than the same parts made from aluminum, which does not absorb heat at the same rate or to the same capacity as iron. Therefore, the sensors used must be calibrated depending upon the metal used in the engine block and cylinder heads.

Turning to FIG. 3, which is a graph of engine torque in Newton-meters (Nm) versus engine speed (RPM), a torque curve 310 for an internal combustion engine 12 is shown. The torque curve 310 represents the maximum torque output of the engine 12 for a given RPM and results in the dome-shaped curve 310. The torque request 340 is a representative location under the curve 310 that results when a driver alters the engine speed to obtain, or request, an amount of torque 320 from the engine 12. The directional arrows 350, 360 represent, respectively, decreases and increases in the torque, which again is dependent upon what a driver requests from the engine 12 in terms of torque, which is governed by engine speed.

Recalling point 280 from FIG. 2, when the thermal event, such as a cooling loss, is set or confirmed in memory, then at that time point 280 a torque management strategy needs to be invoked that disables half of the fuel injectors 15 that entail the fuel feeding system. In other words, half of the fuel injectors 15, which is one bank (16 or 18) of the injectors of a V-8 engine, need to be shut down due to the temperature rise of the engine 12 as sensed by the sensors 20, 22 or 23, or other sensors that may be disposed about the engine. By only shutting down one bank of injectors, the engine can continue to operate and be properly cooled.

The reason that the injectors are alternately disabled one bank at a time is so that cool air can be drawn into the aluminum or metal cylinder block of the non-combusting bank of cylinders without being used in the combustion process in order to cool the engine. That is, one bank of the engine effectively intakes, compresses and exhausts cool air with no combustion ever taking place. This is in contrast to the opposite engine bank that is firing and supporting combustion. This cool air will cool the engine and surrounding metal parts for a calibrated amount of time. In other words, combustion is stopped for a calibrated amount of time for that particular engine cylinder bank to use the cool intake air, relative to that engine cylinder head temperature, in order to cool that engine cylinder bank. The process of causing an engine cylinder bank to stop firing its spark plugs or to stop supporting combustion is known as "deactivating" the cylinder bank and there are many methods of deactivating engine combustion known by those in the art. After combustion is stopped for an amount of time in an engine cylinder bank, activating the cylinder bank, which is the process of beginning to fire the spark plugs of the cylinders or the process of supporting combustion, is again accomplished.

As a consequence of turning off the injectors of half of the engine, the torque output of the engine drops as indicated by the down arrow 350. In order for the driver not to notice this torque output loss when those injectors are disabled, it is necessary that this method compensate for that torque decrease by increasing the torque as shown by the upward-pointing torque arrow 360. If a torque management strategy is not invoked after setting of a flag at point 280, then the torque output will decrease and the driver will experience that reduction, most likely as a slowing of the vehicle and/or a drop in engine speed.

Depending upon the ambient conditions in the combustion chamber, within the intake manifold, and the engine speed, this method recovers the lost output as the engine cools. This recovery occurs when one-half of the engine is cooling and the other half is working harder to maintain the driver's torque request, which may be accomplished by increasing the engine rpm's. Stated another way, when one cylinder bank is not supporting combustion because the fuel injection has been turned off, the opposing cylinder bank is supporting combustion as the engine rpm's increase, thereby increasing engine torque output, in order to compensate for the bank that is not supporting combustion. In this fashion, the driver's torque request is maintained.

According to the teachings of the present invention, the two engine banks alternate back and forth, that is, the cylinder bank supporting combustion is alternated in order to maintain the desired level of torque and the speed of the vehicle. Actually, the torque management system is capable of achieving the maximum level of torque available; however, in order to protect itself, the system reduces the maximum available torque to within the level of calibration. So, in order to maintain the torque demand, one-half of the engine works harder (the cylinders fire more often due to a higher rpm) than it normally would if both banks of the engine were undergoing combustion. While the bank that is operating is supporting combustion, the other will cool for a certain period of time according to the above-described cooling process, and then they exchange roles.

In order to cool just half, or one bank, of the engine, the fuel injection of one bank is stopped, so that combustion ceases in that bank, while maintaining operation of the engine. Therefore, as the cool air is brought into the non-combusting bank, that bank is being cooled, because the intake air is relatively cooler than the engine. Therefore, the non-combusting bank cools because it is acting only as an air pump. The principle is that as one engine bank cools, the other bank temporarily supplements the load of the shut-off bank, then after a calibratable amount of time, roles are exchanged. So, the bank that was supporting combustion will shut down to cool, and then the other bank will activate (restart combustion) and the banks will continue to alternate between activation and deactivation to achieve the overall advantage of maintaining sensor temperatures below a threshold value. The RPMs do not necessarily have to increase, but they might.

To illustrate the point that torque of approximately half of the total engine cylinders at any RPM output can be maintained, FIG. 3 depicts a torque output at a given RPM at point 340. Even when the system is alternating combustion between banks of the engine, the output torque for the given RPM can be anywhere on or below approximately half of the maximum torque curve 310. That is an advantage of the torque management system of the teachings of the present invention, that is, torque can be maintained even when combustion is being alternated between banks of the engine for a calculated period of time. The achievable torque, and hence any lost output, is dependent upon ambient conditions, the conditions within the manifolds, and the engine speed. Again, that is why FIG. 3 depicts the torque point 340, along with the representation of varying torque using the directional arrows 350, 360. As long as the flag is set at point 280 of FIG. 2, then the torque management system will adjust the torque. However, if the flag is not set at torque point 280, then changes in torque reflected by the arrows 350, 360 do not occur, and the methodology of the teachings of the present invention are not invoked.

FIG. 4 is a flowchart depicting how the torque management system 400 actually maintains or controls torque by controlling the cylinder banks of the engine. At step 402, a torque efficiency factor for the first engine cylinder bank is represented, while step 404 represents a torque efficiency factor for the second engine cylinder bank. These torque factors are used, one for each bank, to evaluate the torque produced by each cylinder bank. In an ideal engine, the torque factors will be equal, but because of intake manifold balancing airflow to both banks, and other considerations, the factors for the two banks could be different. In evaluating the torque, these torque efficiency factors are used to calculate the overall efficiency necessary to maintain driver demand within the limits of half of the total number of engine cylinders.

Proceeding to step 406, the torque management system 400 determines whether the fuel injectors are turned off on the first cylinder bank. If the first cylinder bank is turned off, then the system utilizes the first torque efficiency factor. If the fuel injectors for the first cylinder bank are not turned off, then the system proceeds to step 408 and evaluates if the fuel injectors are turned off for the second cylinder bank. If the fuel injectors are turned off on the second cylinder bank, then the second cylinder bank torque efficiency factor issues. When the torque efficiency factor issues, this means that overally engine torque efficiency is modified based on the cumulative torque efficiency factors. The same philosophy applies for the issuance of the torque efficiency factor regarding the first cylinder bank. Furthermore, if the fuel injectors are not turned off, which means they are activated, then the torque efficiency factors are one (1).

When the torque efficiency factors are one, the system assumes that everything is operating properly, and all cylinders are undergoing combustion, and no torque efficiency factor is being utilized. That is, there is no reduction in torque because the efficiency factor is one. This means that the torque can be reduced based on the thermal protection surface, and the torque is practically being reduced at that time. Therefore, at this point, the decisions have been made regarding whether or not the fuel injection systems of each bank have been turned off. That is, either both fuel injection systems are operating, or only one is operating, and if only one is operating, then which one is operating is known.

Step 416 pertains to on-board diagnostics. The on-board diagnostics check the temperature sensor(s) to verify that the data from, for example, the cylinder head temperature sensor, and engine coolant temperature is rational and accurate, whereby 1=yes and 0=no. Step 414 is the next step where an inquiry is made after the on-board diagnostic verifies that the sensor(s) is operating properly. The inquiry at step 414 asks if the engine cylinder heads require thermal management. Thermal management requires use of the torque efficiency factors. The use of the factors depends upon which side or bank of the engine is still undergoing combustion, so the factor first checks a memory location to see which side is not combusting and then it decides if it should use that factor. If the response is yes (1), then the system 400 response includes a limp home torque management routine 500 such that the efficiency fraction is less than one (<1). If the response is no (0), then the system response 400 does not include a limp home torque management routine 500 and the torque efficiency fraction is one (1).

At step 418 of FIG. 4, when the limp home torque management torque efficiency fraction is less than 1, the system is dictating that because only half of the engine is technically producing power, the efficiency is reduced. Therefore, the fraction needs to be included in the overall torque management calculation. The overall torque management calculation utilizes the efficiency in addition to various other efficiencies that are used when positioning the electronic throttle body. The efficiencies is utilized by the electronic throttle body calculations. Ultimately, the throttle is controlled and the fuel that controls combustion and engine torque is controlled.

Proceeding with step 414, if the response to the enquiry is "NO", then the routine proceeds to step 420 where a limp home torque management torque efficiency fraction is practically not included, that is, the fraction is one. In such a situation, the engine is operating to its fullest potential or capacity, which means that all cylinders are firing and more importantly, that no "limp home" torque management is necessary. Upon either the inclusion of a torque efficiency fraction that is less than 1 at step 418, or if the efficiency fraction is 1, as depicted at step 420, the routine proceeds to step 422 where all torque management efficiency factors are evaluated. This enables a driver to maintain speed when a bank of engine cylinders is disabled. Finally, the calculations of step 422 are passed onto the electronic throttle body positioning calculations to set the position of the throttle body to govern fuel intake.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling an engine comprising:
providing a final engine temperature from at least two sensed engine temperatures;
comparing the final engine temperature to a threshold temperature;
deactivating a first group of engine cylinders when the final engine temperature is above a threshold temperature; and
activating the first group of engine cylinders after the first group has been deactivated for a period of time.

2. The method of claim 1, further comprising:
deactivating a second group of engine cylinders when the final engine temperature is above a threshold temperature; and
activating the second group of engine cylinders after the second group has been deactivated for a period of time.

3. The method of claim 1, further comprising:
cooling the first group of engine cylinders after deactivating the first group of engine cylinders.

4. The method of claim 3, wherein cooling the first group of engine cylinders is accomplished by forcing air over the first group of cylinders using a cooling fan and by drawing only air into the first group of cylinders.

5. The method of claim 1, wherein one of the sensed engine temperatures is a cylinder head metal temperature.

6. The method of claim 5, wherein one of the sensed engine temperatures is a liquid coolant temperature.

7. The method of claim 6, further comprising:
inputting the temperature and an operating engine speed to calculate an output engine torque.

8. The method according to claim 1, wherein sensing the temperature above a threshold temperature is performed for a particular period of time before deactivating the first group of engine cylinders.

* * * * *